(12) United States Patent
Lu

(10) Patent No.: US 11,703,692 B2
(45) Date of Patent: Jul. 18, 2023

(54) LASER LIGHT SOURCE DEPOLARIZER AND PROJECTION DEVICE HAVING THE SAME

(71) Applicant: DELTA ELECTRONICS, INC., Taoyuan (TW)

(72) Inventor: Chun-Hsien Lu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/453,857

(22) Filed: Nov. 8, 2021

(65) Prior Publication Data

US 2022/0382068 A1    Dec. 1, 2022

(30) Foreign Application Priority Data

May 25, 2021   (CN) .......................... 202110570382.1

(51) Int. Cl.
  *G02B 27/28*   (2006.01)
  *G03B 21/62*   (2014.01)
  *G03B 21/20*   (2006.01)

(52) U.S. Cl.
  CPC ....... *G02B 27/286* (2013.01); *G03B 21/2033* (2013.01); *G03B 21/62* (2013.01)

(58) Field of Classification Search
  CPC .......... H04N 9/045; H04N 9/30; H04N 9/315; H04N 9/3102; H04N 9/3141; H04N 9/3152; H04N 9/3161; H04N 9/3164; G02B 27/42; G02B 27/281; G02B 27/283; G02B 27/285; G02B 27/286; G02B 27/4205; G03B 21/006; G03B 21/008; G03B 21/28; G03B 21/62; G03B 21/145; G03B 21/208; G03B 21/625; G03B 21/2013; G03B 21/2033; G03B 21/2053

See application file for complete search history.

(56) References Cited

U.S. PATENT DOCUMENTS

| | | | |
|---|---|---|---|
| 8,678,599 B2 | 3/2014 | Gollier | |
| 2010/0253769 A1* | 10/2010 | Coppeta | G02B 27/286 353/7 |
| 2011/0037953 A1* | 2/2011 | Nizani | G02B 3/005 353/38 |
| 2011/0242461 A1* | 10/2011 | Escuti | H04N 9/3167 349/96 |
| 2014/0240676 A1* | 8/2014 | Maes | H04N 9/3158 362/583 |

(Continued)

FOREIGN PATENT DOCUMENTS

| | | |
|---|---|---|
| CN | 106444247 A | 2/2017 |
| TW | 201248297 A1 | 12/2012 |
| TW | I684820 B | 2/2020 |

*Primary Examiner* — Sultan Chowdhury
(74) *Attorney, Agent, or Firm* — CKC & Partners Co., LLC

(57) ABSTRACT

A laser light source depolarizer includes a laser light source, a light angle adjusting element, a birefringent crystal, and an integration rod. The laser light source is configured to emit a laser light. The light angle adjusting element is configured to change the diffusion angle of the laser light. The light angle adjusting element is disposed between the laser light source and the birefringent crystal. The birefringent crystal is disposed between the light angle adjusting element and the integration rod, and the birefringent crystal is configured to break the polarity of the laser light.

10 Claims, 5 Drawing Sheets

(56) References Cited

U.S. PATENT DOCUMENTS

2016/0077417 A1\* 3/2016 Ishikawa .............. H04N 9/3114
                                                                             353/121
2020/0319541 A1\* 10/2020 Tanaka ................. G03B 21/204
2021/0239893 A1\* 8/2021 Di Nicola ................. G01J 4/04
2021/0321066 A1\* 10/2021 Yogo .................... G03B 21/204

\* cited by examiner

LASER LIGHT SOURCE DEPOLARIZER AND PROJECTION DEVICE HAVING THE SAME

CROSS-REFERENCE TO RELATED APPLICATION

This application claims priority to China Application Serial Number 202110570382.1, filed May 25, 2021, which is herein incorporated by reference in its entirety.

BACKGROUND

Field of Invention

The present invention relates to a laser light source depolarizer and a projection device.

Description of Related Art

Independent optical systems are employed in the laser light projection device currently, and the laser lights with different colors are combined along a single optical axis.

Since laser light is polarized light, the internal stress of the screen of a rear projection structure may cause color bumps when the laser light passes the screen. If the laser light is applied for polarized 3D glasses, the non-uniform optical polarity is easily observed by a viewer through the polarized 3D glasses.

Accordingly, it is still a development direction for the industry to provide a laser light source of a projection device that may solve the problems above.

SUMMARY

One aspect of the present disclosure is a laser light source depolarizer.

In some embodiments, the laser light source depolarizer includes a laser light source, a light angle adjusting element, a birefringent crystal, and an integration rod. The laser light source is configured to emit a laser light. The light angle adjusting element is configured to change the diffusion angle of the laser light. The light angle adjusting element is disposed between the laser light source and the birefringent crystal. The birefringent crystal is disposed between the light angle adjusting element and the integration rod, and the birefringent crystal is configured to break the polarity of the laser light.

In some embodiments, a surface of the birefringent crystal facing the light angle adjusting element is parallel with a surface of the birefringent crystal facing the integration rod.

In some embodiments, the birefringent crystal is integrally formed.

In some embodiments, the light angle adjusting element is a diffuser or a lens.

In some embodiments, the laser light source depolarizer further includes an optical adhesive layer disposed between the light angle adjusting element and the birefringent crystal.

In some embodiments, the optical adhesive layer is in contact with the birefringent crystal.

In some embodiments, the laser light source depolarizer further includes an optical adhesive layer disposed between the birefringent crystal and the integration rod.

In some embodiments, the birefringent crystal comprises an anti-reflection coating.

In some embodiments, a surface of the birefringent crystal facing the light angle adjusting element and a surface of the birefringent crystal facing the integration rod form an angle.

Another aspect of the present disclosure is a projection device.

In some embodiments, the projection device includes a laser light source depolarizer, a screen, and a projection module. The screen includes a projection side and a viewing side opposite to the projection side. The projection module receives the light from the integration rod so as to transform the light as an image and project the image on the screen. The projection module is located at the projection side of the screen.

In the aforementioned embodiments, the laser light source depolarizer of the present disclosure can reduce the collimation property of the laser light so as to increase the diffusion angle of the laser light and can break the polarity of the laser light through the birefringent crystal. Subsequently, the laser light is homogenized by the integration rod. As such, the laser light passed the integration rod is suitable for the projection device, for example, rear projection structure or polarized 3D glasses. Therefore, uniformity of the display image can be increased, color lumps can be reduced, and projection image quality can be increased by reducing the collimation property of the laser light and breaking the polarity through the laser light source depolarizer.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
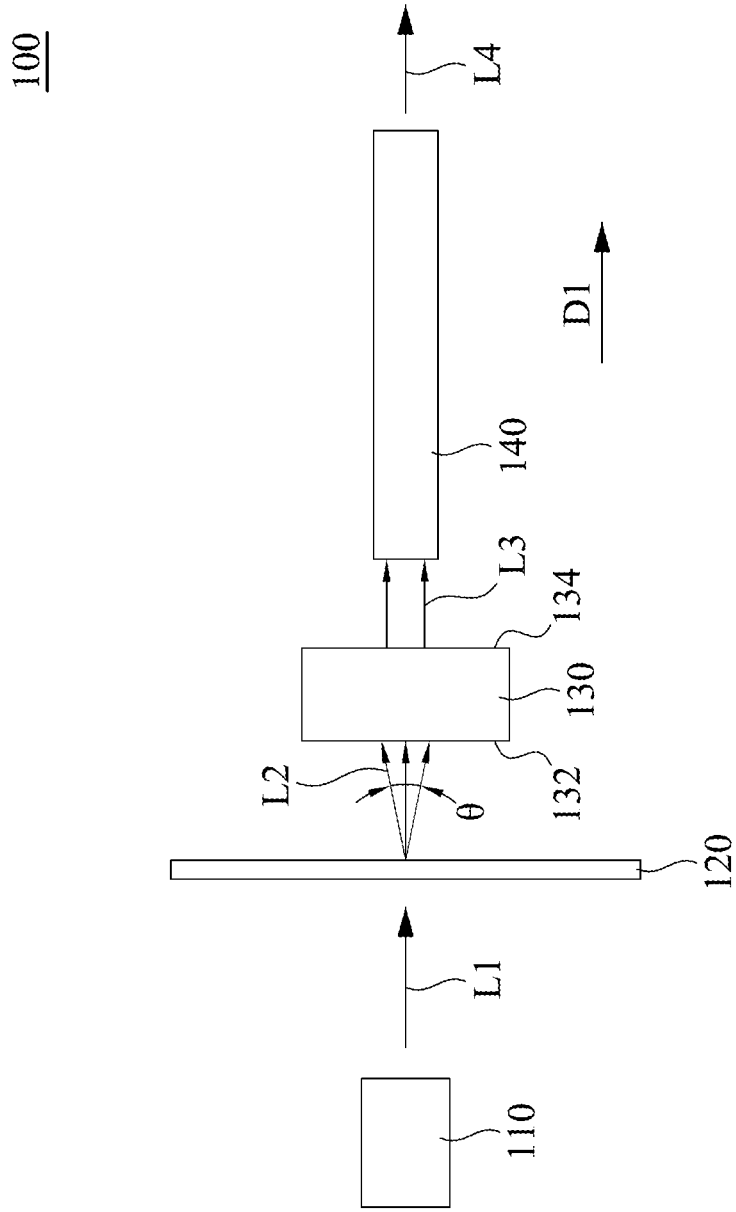
FIG. 1 is a schematic of a laser light source depolarizer according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic of a laser light source depolarizer 100 according to one embodiment of the present disclosure. The laser light source depolarizer 100 includes a laser light source 110, a light angle adjusting element 120, a birefringent crystal 130, and an integration rod 140. The laser light source 110 is configured to emit a laser light L1. The light angle adjusting element 120 is configured to change the diffusion angle $\theta$ of the laser light L1. The light angle adjusting element 120 is disposed between the laser light source 110 and the birefringent crystal 130. The birefringent crystal 130 is disposed between the light angle adjusting element 120 and the integration rod 140.

The light angle adjusting element 120 is disposed to change the transmission direction of the laser light L1. In other words, the light angle adjusting element 120 may increase the diffusion angle θ of the laser light L1 so as to break the collimation property of the laser light L1. The angle adjusting element 120, the birefringent crystal 130, and the integration rod 140 are arranged along the transmission direction of the laser light L1, that is the first direction D1 shown in FIG. 1. The birefringent crystal 130 is configured to break the polarity of the laser light L2 passed the angle adjusting element 120. The integration rod 140 is configured to homogenize the laser light L3 passed the birefringent crystal 130 and transmit the laser light L3 to the projection module of the projection device.

In one embodiment, the angle adjusting element 120 can be diffuser. In other embodiments, the angle adjusting element 120 can be lens. For example, the angle adjusting element 120 can be Fresnel lens or lens with different diopter, as long as the optical element can increase the diffusion angle θ of the laser light L1 so as to break the collimation of the laser light L1.

In the present embodiment, the laser light L2 passed the angle adjusting element 120 has different transmission directions such that the laser light L2 has optical path difference (OPD) when entering the birefringent crystal 130. Therefore, in the present embodiment, a surface 132 of the birefringent crystal 130 facing the angle adjusting element 120 is parallel to a surface 134 of the birefringent crystal 130. In other words, the birefringent crystal 130 of this embodiment can have no inclination. In addition, the birefringent crystal 130 of this embodiment is integrally formed. In some embodiments, the surface 132 of the birefringent crystal 130 facing the angle adjusting element 120 has a coated film such as the anti-reflection coating (AR coating) so as to reduce the possibility for the laser light L2 being reflected, thereby increasing the transmission rate of the laser light L2. In some embodiments, the laser light source depolarizer 100 further includes lenses for collecting lights (not shown) deposed between the birefringent crystal 130 and the integration rod 140, but the present disclosure is not limited in this regard.

Accordingly, the laser light source depolarizer 100 of the present disclosure can reduce the collimation property of the laser light L1 so as to increase the diffusion angle θ of the laser light L1 and can break the polarity of the laser light L2 through the birefringent crystal 130. Subsequently, the laser light L3 is homogenized by the integration rod 140. As such, the laser light L4 passed the integration rod 140 is suitable for the projection device. Specifically, each laser light from a projection device utilizing multi-color laser light may pass the light source depolarizer 100 first before the operation of optical coupling.

Figure 2:
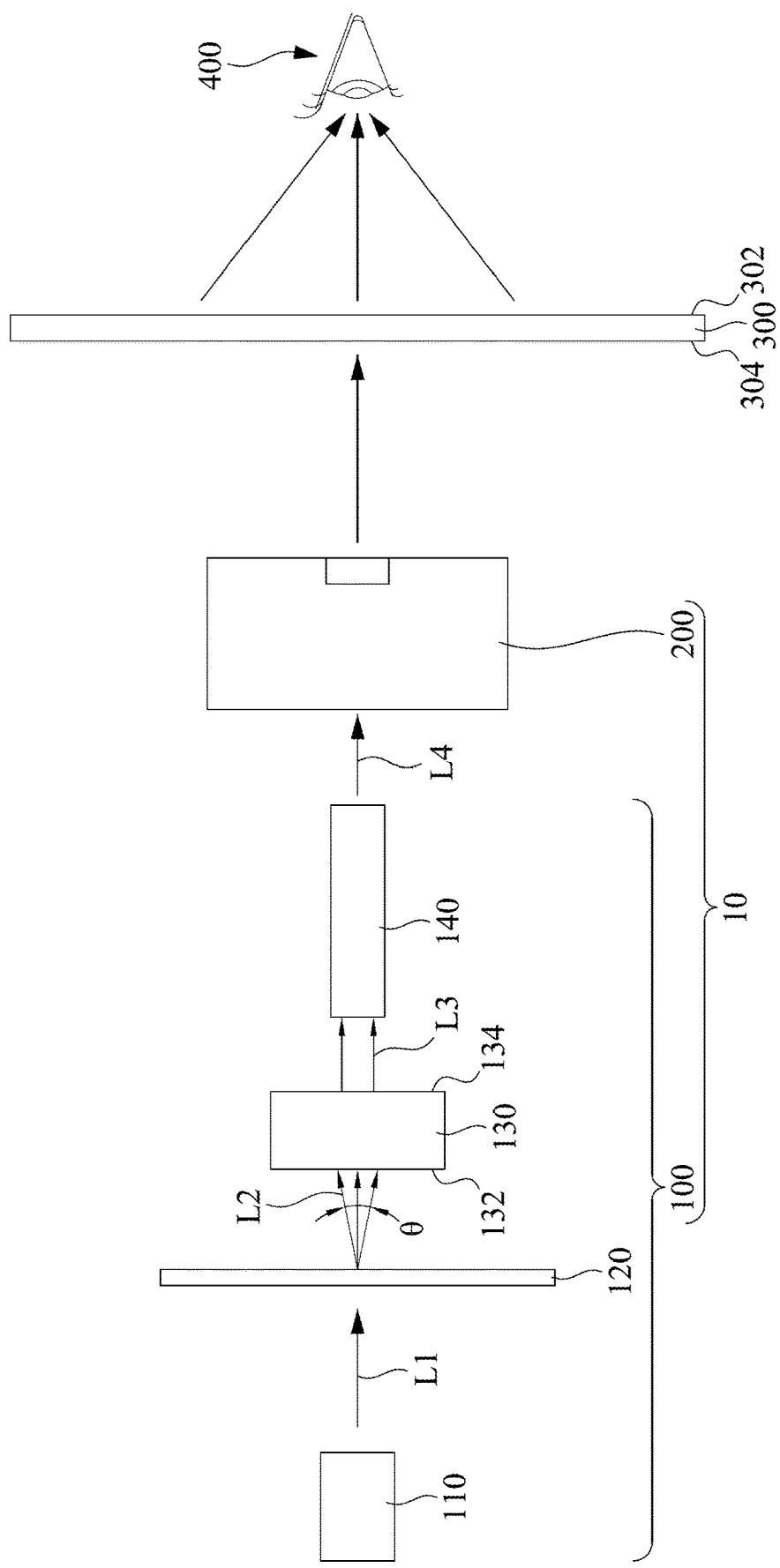
FIG. 2 is a schematic of a laser light source depolarizer applied in a projection device.

FIG. 2 is a schematic of a laser light source depolarizer 100 applied in a projection device 10. The projection device 10 includes the laser light source depolarizer 100 and a projection system 200. As described above corresponding to the FIG. 1, the laser light L4 sequentially passed the light angle adjusting element 120, the birefringent crystal 130, and the integration rod 140 transmits to the projection system 200. In the present embodiment, the projection device 10 is applied in a rear projection structure. The laser light L4 from the integration rod 140 is received by the projection system 200, and the laser light L4 is transformed as an image and is projected on the thin screen 300. A viewer 400 and the projection device 10 are located at opposite sides of the thin screen 300, such as a projection side 304 and a viewing side 302.

During the manufacturing process of the thin screen 300, internal stress may be formed due to heat-up process. When highly collimated and single polarity laser light passes through the thin screen 300, non-uniform absorption efficiency may affect the display image such that color lump may appear. Therefore, uniformity of the display image can be increased, color lumps can be reduced, and projection image quality can be increased by reducing the collimation property of the laser light and breaking the polarity through the laser light source depolarizer 100.

In some other embodiments, the laser light source depolarizer 100 may be applied in the projection device for polarized 3D glasses. Since the laser light is highly polarized, a non-uniform optical polarity is easily observed by a viewer through the polarized 3D glasses. Therefore, and projection image quality can be increased by reducing the collimation property of the laser light and breaking the polarity through the laser light source depolarizer 100.

Figure 3:
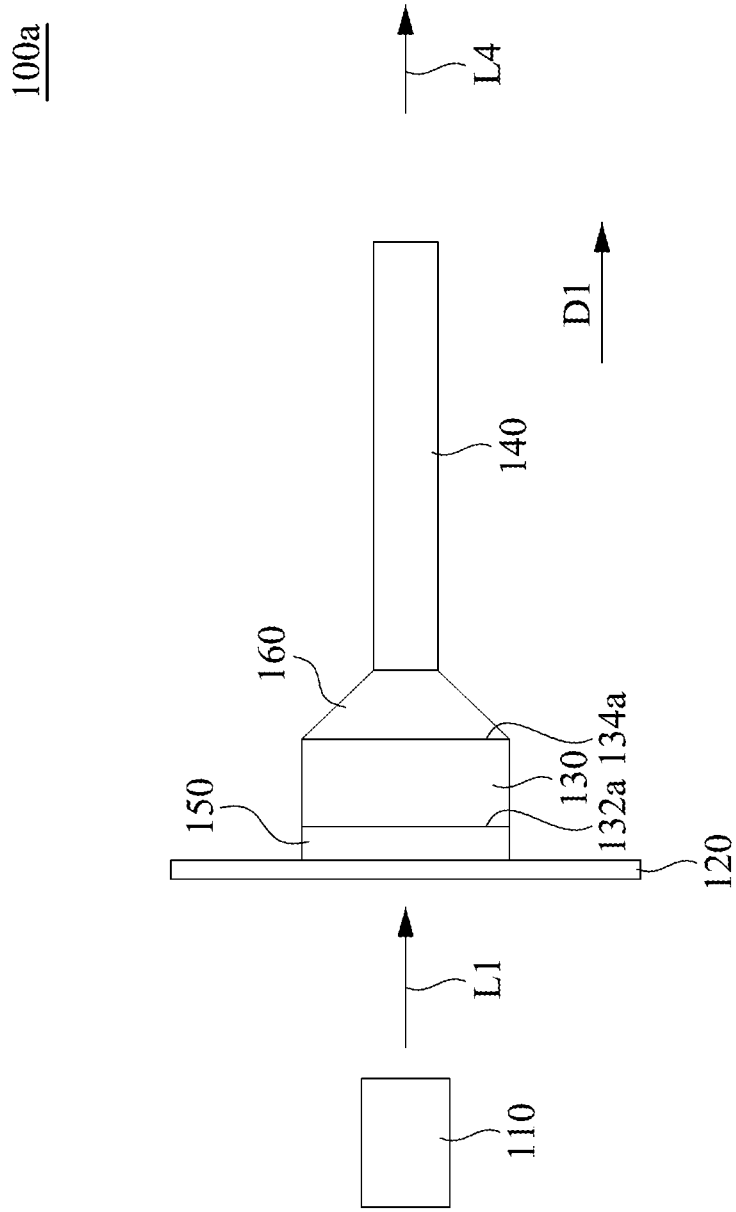
FIG. 3 is a schematic of a laser light source depolarizer according to another embodiment of the present disclosure.

FIG. 3 is a schematic of a laser light source depolarizer 100a according to another embodiment of the present disclosure. The laser light source depolarizer 100a is substantially the same as the laser light source depolarizer 100 shown in FIG. 1, and the difference is that the laser light source depolarizer 100a further includes an optical adhesive layer 150 disposed between the light angle adjusting element 120 and the birefringent crystal 130. In the present embodiment, the optical adhesive layer 150 adhere the light angle adjusting element 120 and the birefringent crystal 130. In other words, the optical adhesive layer 150 is in contact with the surface 132a of the birefringent crystal 130. The optical adhesive layer 150 can reduce the interface reflection of the laser light L2, and therefore the anti-reflection coating is alternately presented. In addition, since a thickness of the optical adhesive layer 150 is thinner, optical depletion can be avoided.

In the present embodiment, the laser light source depolarizer 100a further includes an optical adhesive layer 160 disposed between the birefringent crystal 130 and the integration rod 140. The optical adhesive layer 160 adhere the birefringent crystal 130 and the integration rod 140. In some embodiment, the laser light source depolarizer 100a may only have the optical adhesive layer 160 but no optical adhesive layer 150. The laser light source depolarizer 100a has the same advantages as those of the laser light source depolarizer 100 shown in FIG. 1, and therefore the description is not repeated hereinafter.

Figure 4:
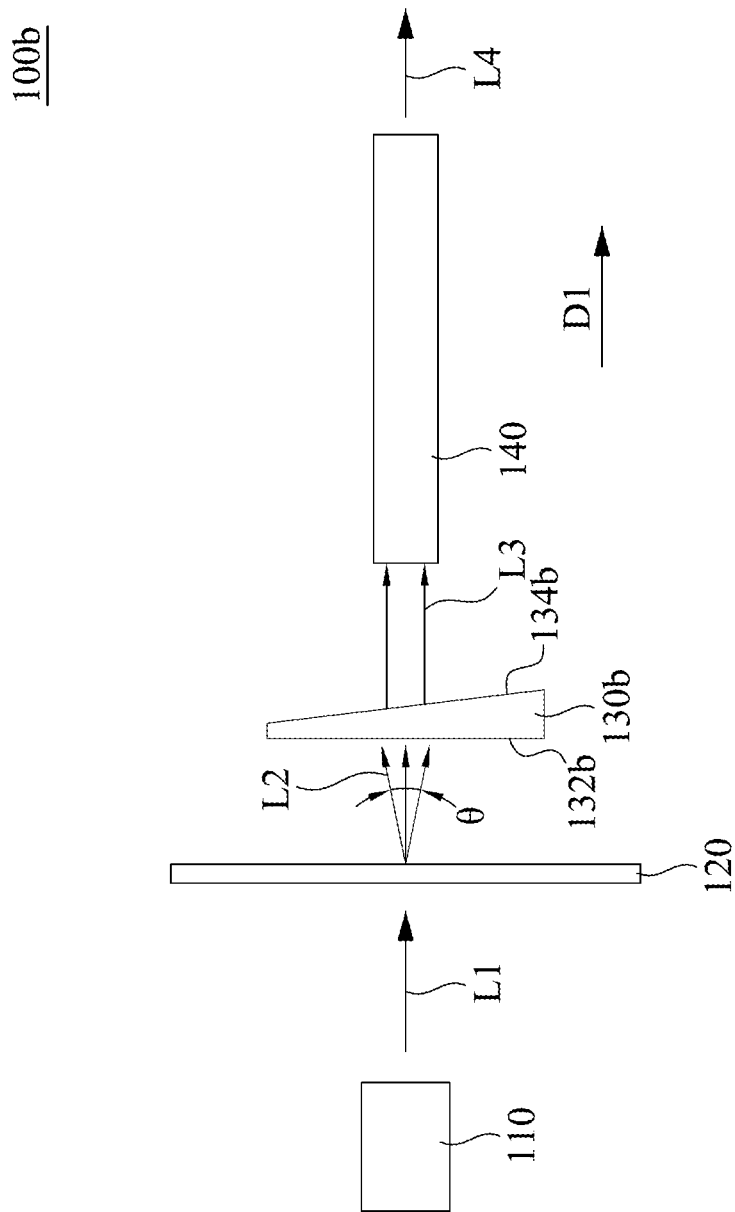
FIG. 4 is a schematic of a laser light source depolarizer according to another embodiment of the present disclosure.

FIG. 4 is a schematic of a laser light source depolarizer 100b according to another embodiment of the present disclosure. The laser light source depolarizer 100b is substantially the same as the laser light source depolarizer 100 shown in FIG. 1, and the difference is that the birefringent crystal 130b of the laser light source depolarizer 100b has wedge shape. The surface 132a and the surface 134a of the birefringent crystal 130b have an angle therebetween. In other words, the laser light L2 can have optical path difference through birefringent crystal 130b so as to break the polarity of the laser light L2. The laser light source depolarizer 100b further includes lenses for collecting lights (not shown) deposed between the birefringent crystal 130b and the integration rod 140, but the present disclosure is not limited in this regard.

Figure 5:
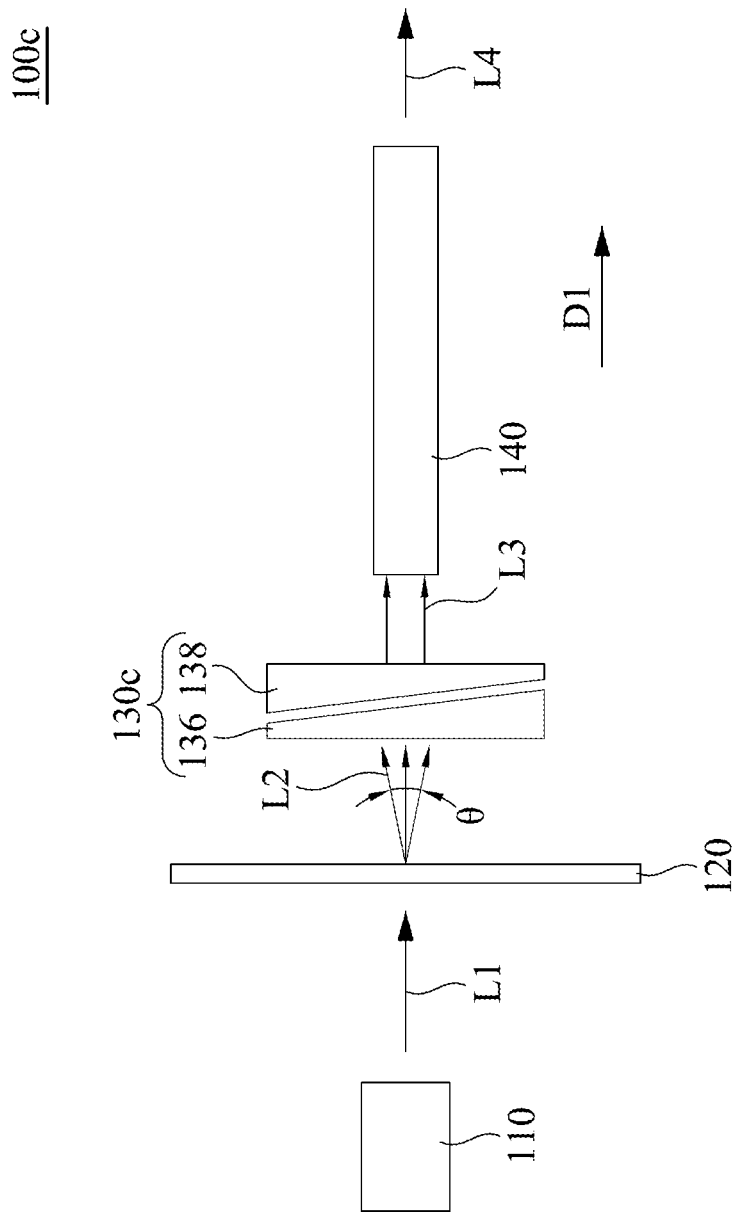
FIG. 5 is a schematic of a laser light source depolarizer according to another embodiment of the present disclosure.

FIG. 5 is a schematic of a laser light source depolarizer 100c according to another embodiment of the present disclosure. The laser light source depolarizer 100c is substantially the same as the laser light source depolarizer 100b shown in FIG. 4, and the difference is that the birefringent crystal 130c of the laser light source depolarizer 100c is formed by two wedge-shaped birefringent materials 136, 138. The birefringent materials 136, 138 match each other such that the laser light l2 can have more optical path difference, and the diffusion angle θ of the laser light L2 remains the same after the laser light L2 passed the birefringent crystal 130c so as to break the polarity of the laser light L2. The laser light source depolarizer 100c further includes lenses for collecting lights (not shown) deposed between the birefringent crystal 130c and the integration rod 140, but the present disclosure is not limited in this regard.

As described above, the laser light source depolarizer of the present disclosure can reduce the collimation property of the laser light so as to increase the diffusion angle of the laser light and can break the polarity of the laser light through the birefringent crystal. Subsequently, the laser light is homogenized by the integration rod. As such, the laser light passed the integration rod is suitable for the projection device, for example, rear projection structure or polarized 3D glasses. Therefore, uniformity of the display image can be increased, color lumps can be reduced, and projection image quality can be increased by reducing the collimation property of the laser light and breaking the polarity through the laser light source depolarizer.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A laser light source depolarizer, comprising:
   a laser light source configured to emit a first laser light;
   a light angle adjusting element configured to increase a diffusion angle of the first laser light to form a second laser light having different transmission directions;
   a birefringent crystal, wherein the light angle adjusting element is disposed between the laser light source and the birefringent crystal, and the birefringent crystal is configured to break the polarity of the second laser light, and the second laser light has an optical path difference when entering the birefringent crystal; and
   an integration rod, wherein the birefringent crystal is disposed between the light angle adjusting element and the integration rod.

2. The laser light source depolarizer of claim 1, wherein a surface of the birefringent crystal facing the light angle adjusting element is parallel with a surface of the birefringent crystal facing the integration rod.

3. The laser light source depolarizer of claim 1, wherein the birefringent crystal is integrally formed.

4. The laser light source depolarizer of claim 1, wherein the light angle adjusting element is a diffuser or a lens.

5. The laser light source depolarizer of claim 1, further comprising:
   an optical adhesive layer disposed between the light angle adjusting element and the birefringent crystal.

6. The laser light source depolarizer of claim 5, wherein the optical adhesive layer is in contact with the birefringent crystal.

7. The laser light source depolarizer of claim 1, further comprising:
   an optical adhesive layer disposed between the birefringent crystal and the integration rod.

8. The laser light source depolarizer of claim 1, wherein the birefringent crystal comprises an anti-reflection coating.

9. The laser light source depolarizer of claim 1, wherein a surface of the birefringent crystal facing the light angle adjusting element and a surface of the birefringent crystal facing the integration rod form an angle.

10. A projection device, comprising:
    a laser light source depolarizer of claim 1;
    a screen comprises a projection side and a viewing side opposite to the projection side; and
    a projection module receiving the light from the integration rod so as to transform the light as an image and project the image on the screen;
    wherein the projection module is located at the projection side of the screen.

* * * * *